(12) United States Patent
Fujihara et al.

(10) Patent No.: US 11,378,378 B2
(45) Date of Patent: Jul. 5, 2022

(54) ONE-DIMENSIONAL MEASUREMENT DEVICE AND PROGRAM

(71) Applicant: MITUTOYO CORPORATION, Kanagawa (JP)

(72) Inventors: Hideaki Fujihara, Miyazaki (JP); Toshihiro Kanematsu, Miyazaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/778,441

(22) Filed: Jan. 31, 2020

(65) Prior Publication Data

US 2020/0249003 A1    Aug. 6, 2020

(30) Foreign Application Priority Data

Feb. 4, 2019    (JP) .............................. JP2019-017777

(51) Int. Cl.
*G01B 5/008* (2006.01)
*G06F 3/14* (2006.01)
*G06F 3/04812* (2022.01)

(52) U.S. Cl.
CPC ......... *G01B 5/008* (2013.01); *G06F 3/04812* (2013.01); *G06F 3/14* (2013.01)

(58) Field of Classification Search
CPC ......... G01B 5/008; G06F 3/14; G06F 3/0482; G06F 3/0484; G06F 3/0488; G06F 3/04812; A61B 34/20; G06T 3/60; A01J 5/007
See application file for complete search history.

(56) References Cited

U.S. PATENT DOCUMENTS

| | | | | |
|---|---|---|---|---|
| 5,129,733 A * | 7/1992 | Enderle | ................... | B23Q 1/38 |
| | | | | 384/12 |
| 5,134,782 A * | 8/1992 | Breyer | .................. | G01B 5/008 |
| | | | | 33/503 |
| 5,471,406 A * | 11/1995 | Breyer | ................. | G01B 21/045 |
| | | | | 700/86 |
| 6,006,126 A * | 12/1999 | Cosman | ................. | A61B 34/20 |
| | | | | 600/414 |
| 6,159,074 A * | 12/2000 | Kube | ....................... | G01B 5/08 |
| | | | | 451/142 |
| 6,745,616 B1 * | 6/2004 | Katayama | ............ | G01B 5/0004 |
| | | | | 33/551 |

(Continued)

FOREIGN PATENT DOCUMENTS

| CN | 108827147 A | * | 11/2018 |
|---|---|---|---|
| JP | 2015169641 A | * | 9/2015 |
| JP | 2016-161502 A | | 9/2016 |

*Primary Examiner* — Steven P Sax
(74) *Attorney, Agent, or Firm* — Greenblum & Bernstein, P.L.C.

(57) ABSTRACT

A one-dimensional measurement device includes a display; a display controller that, based on first input information, displays on the display a rough arrangement and measurement order of each of a plurality of measurable elements of a measurable object and, based on second input information, displays on the display the arrangement and measurement order of each of the plurality of measurable elements where the entire arrangement is rotated in a predetermined direction by a predetermined angle while maintaining a positional relationship of each of the measurable elements; and an input that receives input of the first input information and the second input information.

4 Claims, 4 Drawing Sheets

(56) References Cited

U.S. PATENT DOCUMENTS

| | | | | |
|---|---|---|---|---|
| 7,095,424 B2* | 8/2006 | Satoh | ............... | G06F 3/012 |
| | | | | 345/633 |
| 9,151,589 B2 | 10/2015 | Kanematsu et al. | | |
| 10,605,583 B2 | 3/2020 | Honda et al. | | |
| 10,636,273 B2 | 4/2020 | Tamura et al. | | |
| 2005/0033551 A1* | 2/2005 | Takai | ............... | G01B 21/045 |
| | | | | 702/168 |
| 2009/0093692 A1* | 4/2009 | Hansma | ............... | A61B 5/103 |
| | | | | 433/98 |
| 2012/0227389 A1* | 9/2012 | Hinderks | ............... | F02F 7/008 |
| | | | | 60/317 |
| 2013/0055955 A1* | 3/2013 | Nyberg | ............... | G06Q 50/02 |
| | | | | 119/14.08 |
| 2013/0238281 A1* | 9/2013 | Kanematsu | ............... | G01B 21/30 |
| | | | | 702/168 |
| 2014/0167745 A1* | 6/2014 | Held | ............... | G01B 7/004 |
| | | | | 73/1.79 |
| 2014/0354796 A1* | 12/2014 | Hein | ............... | G02B 21/365 |
| | | | | 348/79 |
| 2016/0195389 A1* | 7/2016 | Sagemueller | ............... | G05B 19/401 |
| | | | | 33/503 |
| 2016/0291688 A1* | 10/2016 | Hirota | ............... | G09G 3/001 |
| 2017/0347979 A1* | 12/2017 | Fehre | ............... | A61B 6/4441 |
| 2018/0038963 A1* | 2/2018 | Yuasa | ............... | G01S 19/36 |
| 2018/0253819 A1* | 9/2018 | Holzer | ............... | G06F 1/1694 |
| 2019/0025713 A1* | 1/2019 | Kato | ............... | G03F 7/70758 |
| 2019/0320878 A1* | 10/2019 | Duindam | ............... | A61B 6/466 |
| 2020/0041246 A1 | 2/2020 | Kanematsu | | |

\* cited by examiner

Fig. 3A
Fig. 3B
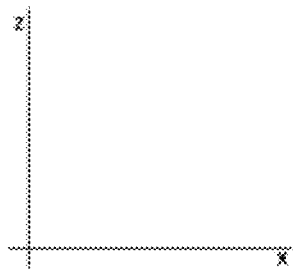
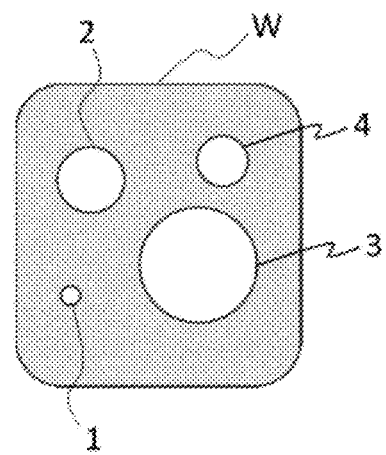
Fig. 3C
Fig. 3D
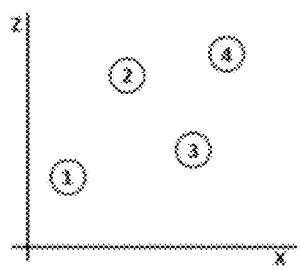
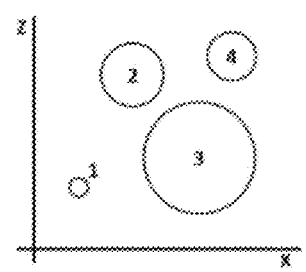

ONE-DIMENSIONAL MEASUREMENT DEVICE AND PROGRAM

CROSS-REFERENCE TO RELATED APPLICATIONS

The present application claims priority under 35 U.S.C. § 119 of Japanese Application No. 2019-017777, filed on Feb. 4, 2019, the disclosure of which is expressly incorporated by reference herein in its entirety.

BACKGROUND OF THE INVENTION

1. Field of the Invention

The present invention relates to a one-dimensional measurement device and program capable of improving ease of work when measuring two-dimensional coordinates.

2. Description of Related Art

A one-dimensional measurement device is a device that includes a stylus head provided so as to be capable of displacement in one direction, and measures dimensions of a measured object by bringing the stylus head into contact with a measurement site on the measured object. Generally, a device called a height measurement device is known that raises and lowers a stylus head in a vertical direction to measure height direction coordinates (see, for example, Japanese Patent Laid-open Publication No. 2016-161502).

Height measurement devices may include devices that display height direction coordinate values as measurement results using simple scale marks or digital numerical values, and also, for example, devices that can measure two-dimensional coordinates of a center or a diameter of a hole, for example, as a measured element that is present on a measured object.

For example, when using a height measurement device to measure two-dimensional coordinates of the center of a circular hole that is present in a measured object, the measured object is set on a stage or similar and first, a height coordinate of the center of the hole is measured in that state, then once the measured object is rotated by 90°, the height coordinate of the center of the hole is measured in that state. By doing this, two-dimensional coordinates for the center of the hole are obtained.

A specific example of a measurement process is described with reference to FIGS. 1A and 1B. FIGS. 1A and 1B illustrate a procedure using a height measurement device to measure two-dimensional coordinates of a measured element for a measured object W that includes three measured elements (a circle 1, circle 2, and circle 3). Specifically, FIG. 1A illustrates a state where an X axis is on a stage surface and a height direction is a Z axis direction. FIG. 1B illustrates a state where the measured object W, together with the X axis and Z axis, is rotated 90°, with the Z axis on the stage surface and the height direction as the X axis direction.

First, in the state illustrated in FIG. 1A, a Z axis coordinate of the center of each of circle 1, circle 2, and circle 3 is measured in that order. A Z axis coordinate $Z_U$ for the highest portion of the circle and a Z axis coordinate $Z_L$ for the lowest portion of the circle are each actually measured, then a Z axis coordinate $Z_C$ for each center is calculated by the measurement device as an intermediate value between $Z_U$ and $Z_L$.

Next, by rotating the measured object W 90° as shown in FIG. 1B, the X axis direction is configured as the height direction, then an X axis coordinate of the center of each of circle 1, circle 2, and circle 3 is measured in that order. An X axis coordinate $X_U$ for the highest portion of the circle and an X axis coordinate $X_L$ for the lowest portion of the circle are each actually measured, then an X axis coordinate $X_C$ for each center is calculated by the measurement device as an intermediate value between $X_U$ and $X_L$.

Then, the measurement results for the Z axis coordinates and the measurement results for the X axis coordinates are compiled in measurement order, yielding measurement results with two-dimensional coordinates (Z, X). In other words, a Z axis coordinate $Z_{c1}$ that is measured first is used as the Z axis coordinate and an X axis coordinate $X_{c1}$ that is measured first is used as the X axis coordinate, and the coordinates are compiled and output as two-dimensional coordinates $(Z_{c1}, X_{c1})$ of circle 1, the Z axis coordinates and X axis coordinates measured second and third are respectively compiled in the same way, and are output as two-dimensional coordinates $(Z_{c2}, X_{c2})$ and $(Z_{c3}, X_{c3})$ of circle 2 and circle 3, respectively.

When measuring two-dimensional coordinates for a plurality of measured elements of a measured object using a one-dimensional measurement device such as a height measurement device, and seeking a method for compiling measurement results (that is, a method for associating and compiling measurement results from before and after rotation using the order of measurement) given in the background art, in order to obtain appropriate measurement results for each of the measured elements, the measurement order of each measured element must be the same before and after rotation.

Given these circumstances, in cases where there are a large number of measured elements, a measured object has a complex shape, or the like, variance before and after rotation is likely to develop in the measurement order of each of the measured elements. Therefore, an operator must, for example, perform measurement while paying careful attention (by taking notes, for example) to the shape of the measured object or the number of the measured element, which impacts the ease of work.

SUMMARY OF THE INVENTION

The present invention provides a one-dimensional measurement device and program capable of improving ease of work when measuring two-dimensional coordinates.

A one-dimensional measurement device according to the present invention is a one-dimensional measurement device that achieves measurement of two-dimensional coordinates for each of a plurality of measured elements of a measured object by measuring a one-dimensional coordinate for each of the measured elements of the measured object and, after rotating the measured object in a predetermined direction by a predetermined angle, measuring a one-dimensional coordinate for each of the measured elements of the rotated measured object. The one-dimensional measurement device includes a display; a display controller that, based on first input information, displays on the display a rough arrangement and measurement order of each of the plurality of measured elements of the measured object and, based on second input information, displays on the display the arrangement and measurement order of each of the plurality of measured elements where the entire arrangement is rotated in a predetermined direction by a predetermined angle while maintaining a positional relationship of each of the measured elements; and an inputter that receives input of the first input information and the second input information.

According to the one-dimensional measurement device configured in this way, when measuring two-dimensional coordinates, the measurement can be performed while verifying, with the display, the measurement order and arrangement of the plurality of measured elements without giving rise to any discrepancies in the measurement order before or after rotation of the measured object, and therefore work such as note-taking becomes unnecessary and ease of work can be improved.

The display controller may reflect, in the display of the arrangement, results of a measurement of a one-dimensional coordinate of the measured object performed while providing a display based on the first input information, and also may reflect, in a rotated display of the arrangement, results of a measurement of a one-dimensional coordinate of the rotated measured object executed by a measurement controller while providing a display based on the second input information.

By doing so, the arrangement of the measured elements is displayed on the display in a form that is close to the actual arrangement, and therefore work can be performed more reliably.

The function of the display controller of the one-dimensional measurement device according to the present invention may be achieved by writing the function in a program and executing the program on a computer.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 3A illustrates a screen for inputting an arrangement of the measured elements;

FIG. 3B illustrates the measured object with the actual size and arrangement of circles;

FIG. 3C illustrates a screen for inputting an arrangement of the measured elements;

FIG. 3D illustrates a screen for inputting an arrangement of the measured elements;

DETAILED DESCRIPTION OF THE INVENTION

Figure 1A:
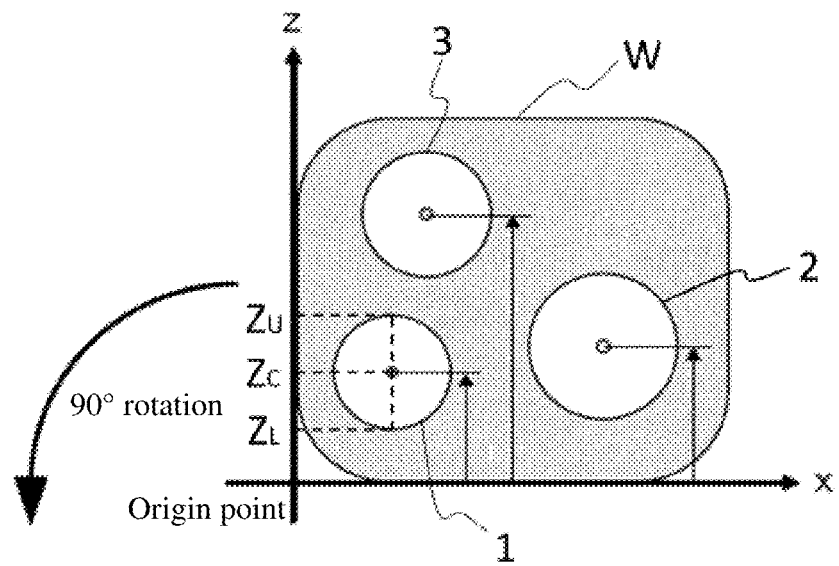
FIGS. 1A and 1B illustrate a procedure for measuring two-dimensional coordinates of a measured element of a measured object, using a height measurement device.
Figure 1B:
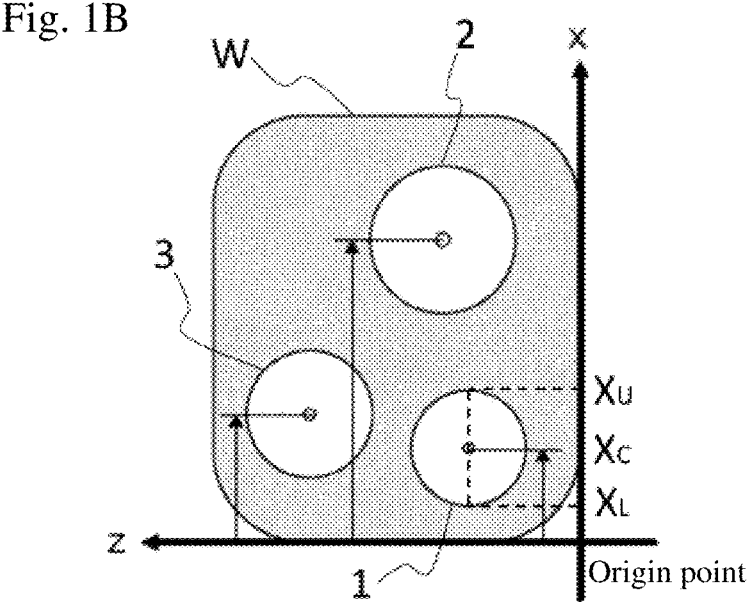

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described with reference to the drawings. In the following description and the drawings, identical reference numerals are assigned to portions having identical functions, and a description of functional portions that have been described previously is either omitted or is limited to what description may be necessary.

A one-dimensional measurement device according to the present disclosure is achieved by adding a display controller function to a conventional one-dimensional measurement device that achieves measurement of two-dimensional coordinates for each of a plurality of measured elements (measurable elements) of a measured object (measurable object) by measuring a one-dimensional coordinate for each of the measured elements of the measured object and, after rotating the measured object in a predetermined direction by a predetermined angle, measuring a one-dimensional coordinate for each of the measured elements of the rotated measured object.

So long as a device measures a measured object while displacing a detector in a one-dimensional direction, the present disclosure can be applied to any type of one-dimensional measurement device. Hereafter, an exemplary case is described in which the one-dimensional measurement device is a height measurement device.

Configuration of Height Measurement Device

Figure 2:
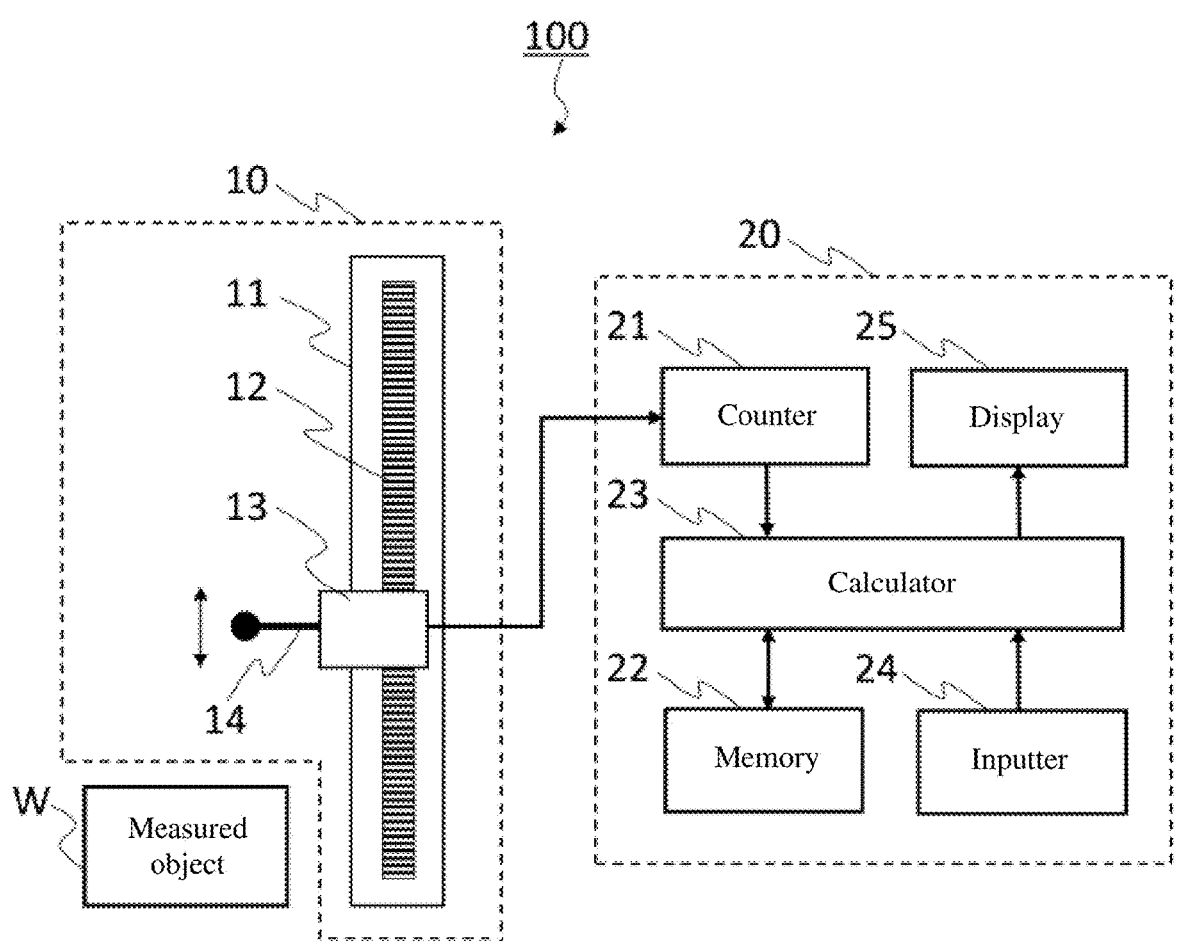
FIG. 2 illustrates an exemplary configuration of a height measurement device 100.

FIG. 2 illustrates an exemplary configuration of a height measurement device 100. The height measurement device 100 is provided with a position detector 10 and a data processor 20.

The position detector 10 is provided with a support portion 11, a linear scale 12, a detection head 13, and a probe 14.

The linear scale 12, where a height direction is defined as a length measurement direction, is provided to the support portion 11, and the support portion 11 supports the detection head 13 so as to be movable along the length measurement direction of the linear scale 12.

The detection head 13 outputs a signal indicating an amount of grid graduation of the linear scale 12 that is traversed due to displacement by an operator.

The probe 14 is an exploratory needle affixed to the detection head 13, and is manually displaced by the operator so as to contact a measured element of a measured object W.

The data processor 20 is a computer and includes a counter 21, a memory 22, a calculator 23, an inputter (also referred to as an input) 24, and a display 25.

The counter 21 specifies a current position of the detection head 13 based on a signal output from the detection head 13.

The memory 22 may be any storage mechanism that stores information on the current position of the detection head 13, a program for achieving the various operations of the present disclosure, and so on.

The calculator 23 is a CPU that retrieves the program from the memory 22 and executes the program.

The inputter 24 may be an input mechanism of any format, such as a keyboard, mouse, or touch panel display that is integrated with the display 25, that allows the operator to input first input information and second input information.

The display 25 may be a display mechanism of any format, such as a liquid crystal display, that displays information related to the measurement.

The data processor 20 need not be configured integrally. At least one of any of the memory 22, the inputter 24, and the display 25 may be provided outside a main body that is connected via a desired format of wired or wireless communication.

Display Controller Function

Based on the first input information, the display controller first displays, on the display 25, a rough arrangement and measurement order of each of the plurality of measured elements of the measured object.

The first input information is information for the rough arrangement and measurement order of each of the plurality of measured elements of the measured object that the operator inputs with the inputter 24.

The display controller may be configured so as to facilitate the operator inputting the first input information so as to, for example, display an input screen on the display 25 and enable the operator to input information thereon using the inputter 24.

For example, the display controller displays on the display 25 a two-dimensional input screen such as that illustrated in FIG. 3A where a base direction of the measured object W is designated as an X axis and the height direction is designated as a Z axis, and stands by for the input of information from the inputter 24. The measured object W includes four measured elements (circle 1, circle 2, circle 3, and circle 4) in the arrangement shown in FIG. 3B, and when measurement is carried out in order of circle number, the operator inputs the rough arrangement of the four measured elements using mouse-clicks or the like on the two-dimensional input screen shown in FIG. 3A. At this point, the order in which the arrangement is input may be used without modification as the measurement order and displayed on the display 25 together with the arrangement, or the input of a separate order after input and display of the arrangement may be received and then displayed. By doing so, the measurement order and arrangement of the measured elements that corresponds to the arrangement of the measured elements of the measured object W is displayed on the display 25 as illustrated in FIG. 3C, for example.

While referencing the measurement order and arrangement of the measured elements illustrated in FIG. 3C that are displayed on the display 25, the operator executes measurement of the Z axis coordinates of each measured element in the displayed measurement order. By doing so, the measurement can be executed without any errors in the planned measurement order.

When the measurement is executed, the display controller may acquire measurement results obtained for the Z axis coordinates and reflect the results in the display of the arrangement. An example of reflecting the results is shown in FIG. 3D. By reflecting the results in this way, the Z axis direction diameter of each measured element is displayed in proportions that conform to reality, and so the risk of errors in the measurement order can be further reduced.

Figure 4A:
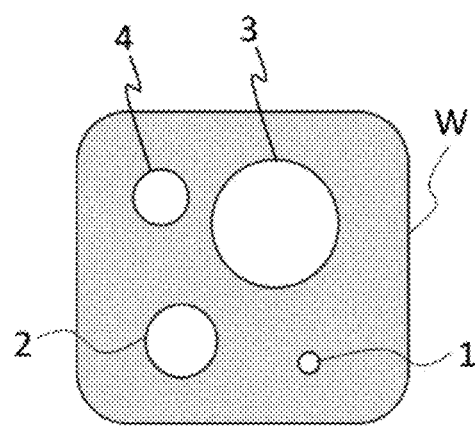
FIG. 4A illustrates the actual rotated measured object.

After the end of Z axis coordinate measurement, the operator rotates the measured object W in a predetermined direction by a predetermined angle. FIG. 4A illustrates an example where the measured object shown in FIG. 3B is rotated counterclockwise by 90°.

After the measured object W is rotated by the predetermined angle, the operator inputs second input information using the inputter 24. The second input information is a command causing the entire arrangement of measured elements displayed on the display 25 according to the input of the first input information to rotate in a predetermined direction by the predetermined angle while maintaining the positional relationship of each of the measured elements. The information related to the rotation angle of the measured object W may be included in the second input information.

Figure 4B:
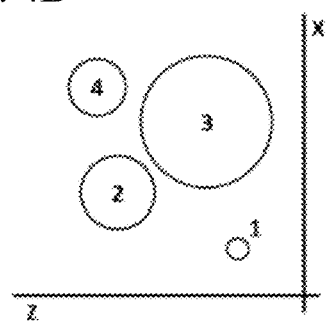
FIG. 4B illustrates a screen display after the entire arrangement of measured elements displayed on the screen is rotated by 90°.

Based on the second input information, the display controller displays, on the display 25, the measurement order and arrangement of each of the plurality of measured elements, the entire arrangement of the measured elements that is displayed on the display 25 according to the input of the first input information being rotated by the predetermined angle in the direction in which the measured object W is rotated. FIG. 4B illustrates an example where the entire arrangement of the measured elements displayed on the display 25 according to the input of the first input information shown in FIG. 3D is rotated counterclockwise by 90°.

While referencing the measurement order and arrangement of the measured elements illustrated in FIG. 4B that are displayed on the display 25, the operator executes measurement of the X axis coordinates of each measured element in the displayed measurement order. By doing so, the measurement can be executed without any errors in the planned measurement order.

Figure 4C:
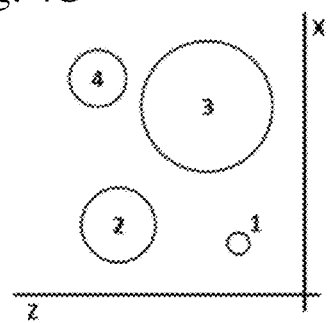
FIG. 4C illustrates a screen display after the entire arrangement of measured elements displayed on the screen is rotated by 90°.

When the measurement is executed, the display controller may acquire measurement results obtained for the X axis coordinates and reflect the results in the display of the arrangement. An example of reflecting the results is shown in FIG. 4C. By reflecting the results in this way, the X axis direction diameter of each measured element is displayed in proportions that conform to reality, and so long as the measurement order is correct, the proportions of the size and arrangement of the circles displayed on the display 25 are substantially similar to those of the measured object W. Therefore, verification of whether there are errors in the measurement order can be performed rapidly.

After the measurement results for the one-dimensional coordinates both before and after rotation of the measured object W are obtained, when the measured object W is rotated by 90° from the state of FIG. 3B to the state of FIG. 4A, two-dimensional coordinates for each of the measured elements can be obtained by directly compiling the measurement results from both before and after rotation.

On the other hand, when the measured object W is rotated by an angle other than 90°, measurement results for each of the measured elements after rotation are transformed based on the measurement results before rotation and the angle of actual rotation, and by compiling these results with the measurement results measured before rotation, two-dimensional coordinates can be obtained.

Method of Adding Display Controller Function

Adding a display controller function to the height measurement device 100 can be achieved by adding a dedicated display controller component to the data processor 20. In addition, the function can also be achieved by providing a configuration where a program written with the display controller function is stored in the memory 22 ahead of time and the calculator 23 retrieves and executes the program.

Furthermore, a function in which, after the measurement results for the one-dimensional coordinates both before and after rotation of the measured object W are obtained, each set of measurement results is directly compiled, or goes through a transformation process and is compiled to obtain two-dimensional coordinates (coordinate compiler) can also be achieved by adding a dedicated component for this function to the data processor 20. In addition, the function can also be achieved by providing a configuration where a program written with this function is stored in the memory 22 ahead of time and the calculator 23 retrieves and executes the program. Information for the rotation angle of the measured object W when a transformation process is performed may, for example, use that which is input included in the second input information.

According to the one-dimensional measurement device of the present disclosure described in the foregoing, when measuring two-dimensional coordinates, the measurement can be performed while verifying, with the display, the measurement order and arrangement of the plurality of measured elements without giving rise to any discrepancies in the measurement order before or after rotation of the measured object, and therefore work such as note-taking becomes unnecessary and ease of work can be improved.

The present invention is not limited to the above-noted embodiments. The embodiments are provided by way of example, and embodiments that include configurations essentially identical to the technical ideas recited in the scope of the claims of the present invention and that achieve similar beneficial effects are included within the technical scope of the present invention, whatever the form. Specifically, the present invention may be modified as needed within the scope of the technical ideas reflected in the invention. Embodiments featuring such modifications or improvements are within the technical scope of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A one-dimensional measurement device comprising:
  a position detector, including:
    a scale provided on a support and extending in a height direction of the support, and
    a detection head including a probe and attached to the support, the detection head configured to be moveable along a length measurement direction of the scale to measure two-dimensional coordinates for each of a plurality of measurable elements on a measurable object by:
      measuring a one-dimensional coordinate of a first diameter point and a second diameter point for each of the measurable elements of the measurable object, wherein the first diameter point and the second diameter point are on opposing sides of a center point of each of the measurable elements,
      physically rotating the measurable object in a predetermined direction by a predetermined angle, and
      measuring a one-dimensional coordinate of the first diameter point and the second diameter point for each of the measurable elements of the physically rotated measurable object,
  a display;
  an input receiver that receives from an operator input of:
    first input information wherein the operator determines the center point of each of the plurality of measurable elements, and selects the center point of each of the plurality of measurable elements in a particular order to be measured, to set a determined measurement order; and
  a controller comprising a processor and a memory that stores a set of executable instructions, wherein upon execution of the executable instructions by the processor, the controller performs operations comprising:
    based on the first input information from the operator, displaying on the display a first configuration that displays a rough arrangement determined by the center point and the measurement order of each of the plurality of measurable elements of the measurable object to be measured by the position detector, the plurality of measurable elements being displayed in the first configuration having different proportions relative to proportions of the actual measurements of the plurality of measurable elements,
    displaying on the display a first measurement by the position detector of the first diameter point and the second diameter point of each of the plurality of measurable elements in the first configuration, wherein a position of each of the plurality of measurable elements in the first measurement is determined by the measurement order and the arrangement of each of the plurality of measurable elements,
    receiving second input information from the operator at the input receiver, wherein the operator inputs a command for the position detector to physically rotate the measurable object in the predetermined direction by the predetermined angle while maintaining a positional relationship of each of the measurable elements to be measured by the position detector,
    based on the second input information from the operator, displaying on the display a second configuration that displays the arrangement determined by the center point and the measurement order of each of the plurality of measurable elements, the plurality of measurable elements displayed in the second configuration being displayed in same proportions relative to the proportions of the actual measurements of the plurality of measurable elements,
    displaying on the display a second measurement by the position detector of the first diameter point and the second diameter point of each of the plurality of measurable elements in the second configuration, wherein a position of each of the plurality of measurable elements in the second measurement is determined by the measurement order and the arrangement of each of the plurality of measurable elements, and
    prompting the operator for verification, based on the display of the first configuration and the second configuration, of the measurement order and arrangement of the plurality of measured elements.

2. The one-dimensional measurement device according to claim 1, wherein the display controller, upon execution of the executable instructions by the processor, performs operations further comprising:
  reflecting in a display of the arrangement, the results of the first measurement of the one-dimensional coordinate of the measurable object performed by the position detector while providing the display based on the first input information, and
  reflecting, in a rotated display of the arrangement, the results of the second measurement of the one-dimensional coordinate of the rotated measurable object performed by the position detector while providing the display based on the second input information.

3. At least one tangible, non-transitory computer-readable medium storing an executable set of instructions for controlling a one-dimensional measurement device, wherein the set of instructions, when executed by a computer processor, causes the computer processor to execute operations comprising:
  measuring a one-dimensional coordinate of a first diameter point and a second diameter point for each of a plurality of measurable elements of a measurable object with a position detector, wherein the first diameter point and the second diameter point are on opposing sides of a center point of each of the measurable elements, the position detector including a scale provided on a support and extending in a height direction of the support, and a detection head, including a probe, attached to the support and configured to be moveable along a length measurement direction of the scale,
  physically rotating the measurable object in a predetermined direction by a predetermined angle,
  measuring with the position detector, a one-dimensional coordinate of the first diameter point and the second diameter point for each of the measurable elements of the physically rotated measurable object,
  receiving, from an input receiver, an operator input of:
    first input information wherein the operator determines the center point of each of the plurality of measurable elements, and selects the center point of each of the plurality of measurable elements in a particular order to be measured, to set a determined measurement order, and
  based on the first input information from the operator, displaying on the display a first configuration that displays a rough arrangement determined by the center point and the measurement order of each of the plurality of measurable elements of the measurable object to be measured by the position detector, the plurality of measurable elements being displayed in the first configuration having different proportions relative to proportions of the actual measurements of the plurality of measurable elements,
  displaying on the display a first measurement by the position detector of the first diameter point and the second diameter point of each of the plurality of measurable elements in the first configuration, wherein a position of each of the plurality of measurable elements in the first measurement is determined by the measurement order and the arrangement of each of the plurality of measurable elements,
  receiving second input information from the operator at the input receiver, wherein the operator inputs a command for the position detector to physically rotate the measurable object in the predetermined direction by the predetermined angle while maintaining a positional relationship of each of the measurable elements to be measured by the position detector,
  based on the second input information from the operator, displaying on the display a second configuration that displays the arrangement determined by the center point and the measurement order of each of the plurality of measurable elements, the plurality of measurable elements displayed in the second configuration being displayed having same proportions relative to the proportions of the actual measurements of the plurality of measurable elements,
  displaying on the display a second measurement by the position detector of the first diameter point and the second diameter point of each of the plurality of measurable elements in the second configuration, wherein a position of each of the plurality of measurable elements in the second measurement is determined by the measurement order and the arrangement of each of the plurality of measurable elements, and
  prompting the operator for verification, based on the display of the first configuration and the second configuration, of the measurement order and arrangement of the plurality of measured elements.

4. The at least one tangible, non-transitory computer-readable medium according to claim 3, wherein the set of instructions, when executed by the computer processor, causes the computer processor to execute operations further comprising:
  reflecting in a display of the arrangement, the results of the first measurement of the one-dimensional coordinate of the measurable object performed by the position detector while providing the display based on the first input information, and
  reflecting, in a rotated display of the arrangement, the results of the second measurement of the one-dimensional coordinate of the rotated measurable object performed by the position detector while providing the display based on the second input information.

* * * * *